US012685898B2

(12) United States Patent
Xu et al.

(10) Patent No.: US 12,685,898 B2
(45) Date of Patent: Jul. 21, 2026

(54) DETERMINATION OF SPIN RATE AND SPIN AXIS OF A BALL IN FLIGHT

(71) Applicant: RAPSODO PTE. LTD., Singapore (SG)

(72) Inventors: Dejiang Xu, Singapore (SG); Botan Yildirim, Singapore (SG); Evgeny Lipunov, Singapore (SG); Aditya Vishwanath, Singapore (SG); Batuhan Okur, Singapore (SG)

(73) Assignee: Rapsodo Pte. Ltd., Singapore (SG)

( * ) Notice: Subject to any disclaimer, the term of this patent is extended or adjusted under 35 U.S.C. 154(b) by 351 days.

(21) Appl. No.: 18/517,731

(22) Filed: Nov. 22, 2023

(65) Prior Publication Data

US 2025/0161750 A1    May 22, 2025

(51) Int. Cl.
$A63B\ 24/00$ (2006.01)
$G06T\ 7/246$ (2017.01)
$A63B\ 102/20$ (2015.01)

(52) U.S. Cl.
CPC .......... $A63B\ 24/0021$ (2013.01); $G06T\ 7/246$ (2017.01); $A63B\ 2024/0034$ (2013.01); $A63B\ 2102/20$ (2015.10); $A63B\ 2220/05$ (2013.01); $A63B\ 2220/35$ (2013.01); $A63B\ 2220/807$ (2013.01); $G06T\ 2207/10016$ (2013.01); $G06T\ 2207/20081$ (2013.01); $G06T\ 2207/20084$ (2013.01); $G06T\ 2207/30224$ (2013.01)

(58) Field of Classification Search
None
See application file for complete search history.

(56) References Cited

U.S. PATENT DOCUMENTS

| | | | |
|---|---|---|---|
| 8,951,138 | B2 | 2/2015 | Kiraly et al. |
| 9,171,211 | B2 | 10/2015 | Keat et al. |
| 2013/0304417 | A1 | 11/2013 | Mooney et al. |
| 2014/0342844 | A1 | 11/2014 | Mooney |
| 2018/0140898 | A1 | 5/2018 | Kasha |
| 2018/0272221 | A1* | 9/2018 | Sundararajan ........... G09B 9/00 |
| 2020/0282283 | A1 | 9/2020 | Xu et al. |
| 2020/0298092 | A1 | 9/2020 | Okur et al. |
| 2021/0170257 | A1 | 6/2021 | Tuxen |
| 2021/0178244 | A1 | 6/2021 | Okur et al. |

(Continued)

FOREIGN PATENT DOCUMENTS

| | | |
|---|---|---|
| JP | 2008-305372 A | 12/2008 |
| JP | 2015-517889 A | 6/2015 |

OTHER PUBLICATIONS

Chen et al., "Joint Time-Frequency Analysis for Radar Signal and Image Processing," IEEE Signal Processing Magazine, Mar. 31, 1999, 16(2):81-93.

(Continued)

*Primary Examiner* — Vikkram Bali
(74) *Attorney, Agent, or Firm* — Fish & Richardson P.C.

(57) ABSTRACT

Embodiments are disclosed for determining the spin rate and the spin axis of a ball in flight. In some embodiments, a method comprises: capturing, with an image sensor, a time series of images of a ball in flight and corresponding image capture times; inputting, with at least one processor, the image frames and the image capture times into a machine learning model; and predicting, with the at least one processor, a spin axis and a spin rate of the ball based on the machine learning model.

20 Claims, 10 Drawing Sheets

(56) References Cited

U.S. PATENT DOCUMENTS

| | | | |
|---|---|---|---|
| 2021/0220718 A1 | 7/2021 | Tuxen et al. | |
| 2022/0026531 A1 | 1/2022 | Wu et al. | |
| 2022/0233939 A1* | 7/2022 | Oh | G06T 7/246 |
| 2022/0291328 A1 | 9/2022 | Ozturk et al. | |
| 2022/0343514 A1 | 10/2022 | Jayaram et al. | |
| 2023/0070986 A1 | 3/2023 | Okur et al. | |
| 2023/0343001 A1 | 10/2023 | Okur et al. | |
| 2023/0364468 A1 | 11/2023 | Okur et al. | |
| 2024/0420346 A1* | 12/2024 | Messina | G06T 7/251 |
| 2025/0325874 A1 | 10/2025 | Okur et al. | |

OTHER PUBLICATIONS

Extended European Search Report in European Appln. No. 22863729. 4, mailed on Mar. 28, 2025, 11 pages.

International Preliminary Report on Patentability in International Appln. No. PCT/IB2022/058025, mailed on Mar. 14, 2024, 7 pages.

International Search Report and Written Opinion in International Appln. No. PCT/SG2024/050720, mailed on Jan. 20, 2025, 9 pages.

Notice of Allowance in Japanese Appln. No. 2024-506252, mailed on Aug. 6, 2024, 5 pages (with English translation).

Tebbe et al., "Spin Detection in Robotic Table Tennis," 2020 IEEE International Conference on Robotics and Automation (ICRA), May 31, 2020-Aug. 31, 2020, pp. 9694-9700.

Aggarwal, "YOLO Explained," Analytics Vidhya, Dec. 27, 2020, retrieved on Aug. 26, 2024, retrieved from URL<https://medium.com/analytics-vidhya/yolo-explained-5b6f4564f3>, 18 pages.

Bhatt, "Deep Learning—Understanding Receptive field in Computer Vision," Feb. 6, 2020, retrieved on Aug. 21, 2024, retrieved from URL<https://www.linkedin.com/pulse/deep-learning-understanding-receptive-field-computer-n-bhatt/>, 10 pages.

Ding et al., "Scaling Up Your Kernels to 31×31: Revisiting Large Kernel Design in CNNs," CoRR, Submitted on Apr. 2, 2022, arXiv:2203.06717v4, 16 pages.

International Search Report and Written Opinion issued in corresponding application No. PCT/IB2022/058025, dated Apr. 6, 2023.

Redmon et al., "You Only Look Once: Unified, Real-Time Object Detection," CoRR, Submitted on Jun. 8, 2015, arXiv:1506.02640v1, 9 pages.

Wang et al., "YOLOv10: Real-Time End-to-End Object Detection," CoRR, Submitted on May 23, 2024, arXiv:2405.14458v1, 18 pages.

* cited by examiner $$\begin{bmatrix} x_1, y_1, z_1, x_2, y_2, z_2, x_3, y_3, z_3, x_4, y_4, z_4, x_5, y_5, z_5, x_6, y_6, z_6, x_7, y_7, z_7, x_8, y_8, z_8, \\ -x_1, -y_1, -z_1, -x_2, -y_2, -z_2, -x_3, -y_3, -z_3, -x_4, -y_4, -z_4, \\ -x_5, -y_5, -z_5, -x_6, -y_6, -z_6, -x_7, -y_7, -z_7, -x_8, -y_8, -z_8, \\ \Delta T_1, \Delta T_2, \Delta T_3, \Delta T_4, \Delta T_5, \Delta T_6, \Delta T_7, \end{bmatrix}$$

FOR SPIN REGRESSION MODEL, INPUT IS AS BELOW:

$$\begin{bmatrix} x_1, y_1, z_1, x_2, y_2, z_2, x_3, y_3, z_3, x_4, y_4, z_4, x_5, y_5, z_5, x_6, y_6, z_6, x_7, y_7, z_7, x_8, y_8, z_8, \\ -x_1, -y_1, -z_1, -x_2, -y_2, -z_2, -x_3, -y_3, -z_3, -x_4, -y_4, -z_4, \\ -x_5, -y_5, -z_5, -x_6, -y_6, -z_6, -x_7, -y_7, -z_7, -x_8, -y_8, -z_8, \\ \Delta T_1/\Delta T_2, \Delta T_2/\Delta T_3, \Delta T_3/\Delta T_4, \Delta T_4/\Delta T_5, \Delta T_5/\Delta T_6, \Delta T_6/\Delta T_7 \end{bmatrix}$$

FIG. 7A

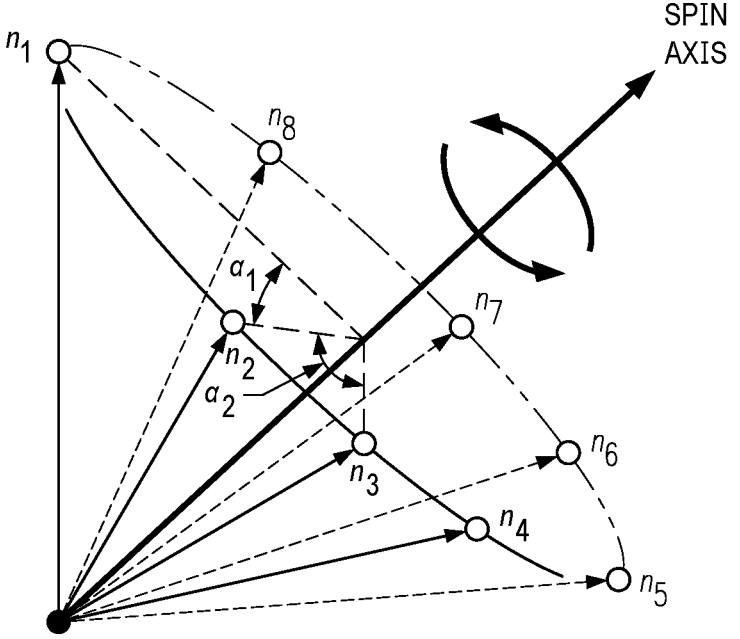

801 — CAPTURING TIMES SERIES OF IMAGES OF BALL IN FLIGHT AND CORRESPONDING TIMES

802 — INPUTTING IMAGES AND TIMES INTO MACHINE LEARNING MODEL

803 — PREDICTING SPIN RATE AND SPIN AXIS OF BALL BASED ON MACHINE LEARNING MODEL

900

901 — VIEWING DEVICE

902 — MEASURING DEVICE

DETERMINATION OF SPIN RATE AND SPIN AXIS OF A BALL IN FLIGHT

TECHNICAL FIELD

This disclosure relates generally to sports technologies and data analytics, and in particular to ball launch monitoring.

BACKGROUND

Data-driven sports technologies and data analytics help players and coaches better understand performance through reliable data. One such sports technology is ball launch monitoring. For example, a ball launch monitor may use video to determine various ball parameters. Two examples of ball parameters are spin rate and spin axis. A spin rate is the speed that a ball spins on its spin axis. A high spin rate will give a ball in flight more height and a steep landing angle, and a low spin rate will give the ball less height and a shallow landing angle. Accordingly, it is desirable to monitor the spin rate and spin axis of a ball in flight to improve a player's performance in ball-related sports, such as cricket, baseball and golf.

SUMMARY

Embodiments are disclosed for determining the spin rate and the spin axis of a ball in flight.

In some embodiments, a method comprises: capturing, with an image sensor, a time series of images of a ball in flight and corresponding image capture times; inputting, with at least one processor, the image frames and the image capture times into a machine learning model; and predicting, with the at least one processor, a spin axis and a spin rate of the ball based on the machine learning model.

In some embodiments, the machine learning model includes a first neural network trained to predict seam norms of the ball in 3D space based on a training set of ball images, a second neural network trained to predict the spin rate of the ball based on the predicted seam norms and time differences obtained from the training set of ball images, and a third neural network trained to predict the spin axis of the ball based on the predicted seam norms and ratios of the time differences.

In some embodiments, the training set of ball images include synthetic ball images of different types of balls, and wherein the ball images have non-uniform lighting, complex backgrounds, occlusions, or artifacts.

In some embodiments, the training set of ball images include augmented ball images of different types of balls, and wherein the ball images have at least one of random color, random contrast, random brightness, random sharpness, random shift or random noise level.

In some embodiments, randomly generated synthetic seam norms are used to train the first neural network.

In some embodiments, the first, second and third neural networks are trained using batch processing, stochastic gradient descent, Nesterov momentum without dampening, a weight decay or a cosine-shaped learning rate.

In some embodiments, the first, second and third neural networks are regression neural networks.

In some embodiments, the first neural network comprises M blocks, where each block includes a transition unit to downsample a feature size, followed by N residual units, where N and M are integer values greater than zero.

In some embodiments, the second and third neural networks each include M blocks, each block having a fully connected layer to increase a number of inputs, followed by N residual units, where each residual unit includes a first fully connected layer, followed by a first activation function, followed by a second fully connected layer, followed by a second activation function, where N and M are integer values greater than zero.

In some embodiments, the ball is a cricket ball.

Other embodiments are directed to an apparatus and computer-readable medium.

Particular embodiments described herein provide one or more of the following advantages. Existing ball monitoring applications segment out the seam line of the ball as a feature and do feature matching. It is challenging, however, to segment out the whole seam line due to non-uniform illumination, artifacts, logos, occlusions, and different types of balls. It is also very time consuming to do feature matching. Unlike these existing ball monitoring applications, the disclosed embodiments directly measure seam norms from ball images with a machine learning model (e.g., deep learning network) that has been trained on ball images that have been synthesized and/or augmented to ensure that all possible challenging situations are included in the training data for the machine learning model. Additionally, the disclosed machine learning model has a separate spin rate and spin axis regression node, which makes the prediction of ball parameters robust to outliers.

BRIEF DESCRIPTION OF THE DRAWINGS

FIGS. 7A and 7B illustrate synthetic seam norm generation, according to one or more embodiments.

DETAILED DESCRIPTION

Figure 1A:
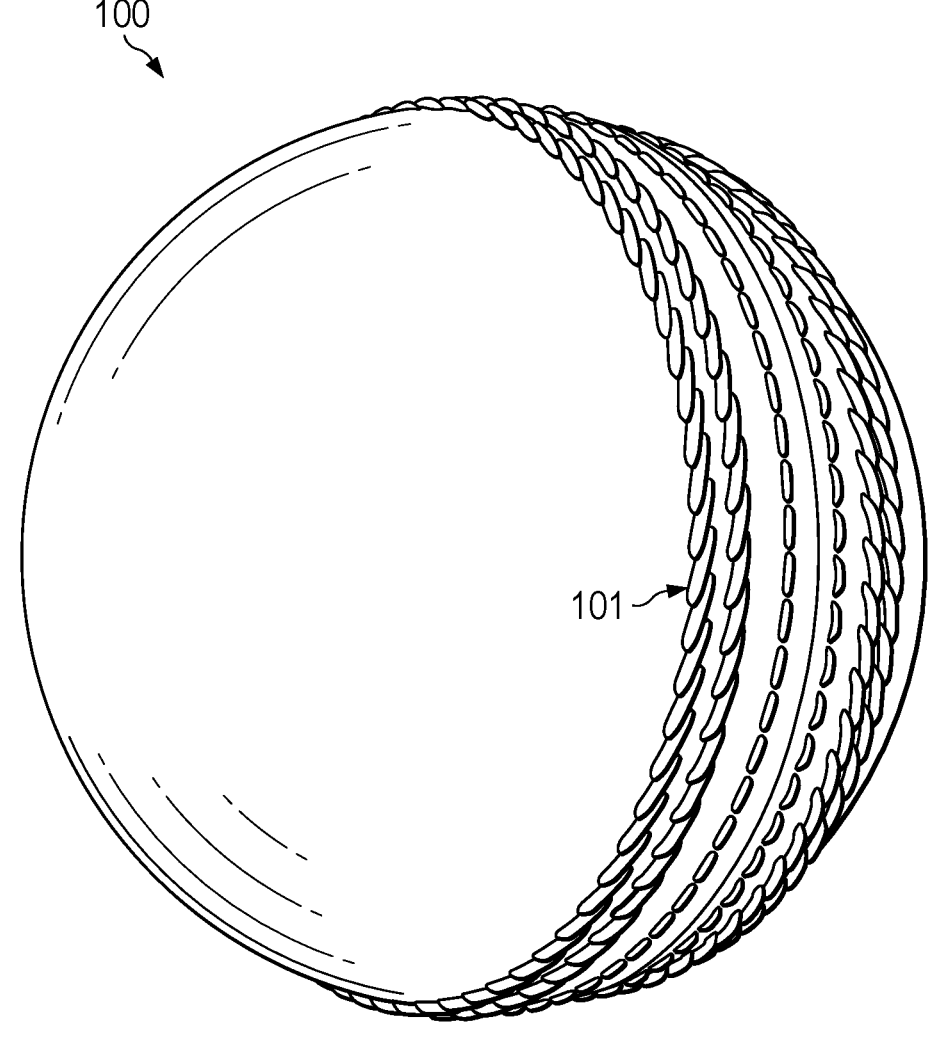
FIG. 1A is a perspective view of a cricket ball.

Bowling in cricket is the action of propelling the ball toward the wicket defended by a batter. Understanding proper bowling mechanics is crucial for bowlers to master various bowling tactics, such as delivering fast or spin bowling. Distinguishing between different bowling techniques relies on factors like the ball's trajectory and speed, determined by the angular velocity and initial velocity of the ball at the point of release.

Additionally, factors like drift and dip also play a significant role in the ball's direction during its flight. When a ball drifts, it veers sideways during its flight, creating a horizontal deviation. On the other hand, dip causes the ball to descend closer to the ground than expected, resulting in a non-linear alteration in its vertical movement. The spinning motion of the ball during its flight counteracts the airflow, leading the airflow to move upward, generating a downward force that causes the ball to dip. This phenomenon, known as the Magnus effect, is closely associated with the spin. While a radar gun is capable of measuring the speed of a cricket ball, it falls short in providing insights into the ball's spin properties. Therefore, the ability to measure the spin properties of a ball becomes insightful. Such measurements can equip coaches with a quantitative assessment of key spin bowling performance variables, enabling them to offer objective feedback to players on their performance.

In baseball, understanding the spin axis and the spin rate can provide information to the pitcher in letting the pitcher know whether their pitch is a fastball, knuckleball, curveball, etc. This information helps the pitcher in improving and developing the "perfect pitch".

The present disclosure provides the use of seam norm from ball images with a trained deep learning neural network to estimate the spin properties including spin axis and the spin rate. This information can be used to measure the spin properties of the ball, for example a cricket ball. The seam norm vector model described herein is advantageously more efficient and effective as it does not segment out seam lines and thus feature matching is not required. It is acknowledged that segmenting the whole seam line is challenging due to non-uniform illumination artifact, logo, occlusion, and different types of balls. Further, the segmentation approach is time consuming to do feature matching. The methods disclosed herein advantageously measure seam norm directly from ball image with a neural network. Further, spin rate and axis regression modes are advantageously robust to outliers. For balls that do not have a seam that circumvents the entire ball and thus defines a seam plane (e.g., baseballs, golf balls, soccer balls, footballs, basketballs), a sticker can be wrapped around the ball that will act as a proxy for a stitched seam, and the disclosed embodiments can be applied to any ball regardless of whether it has a stitched seam.

Physics of Spin Rate and Spin Axis

Figure 1B:
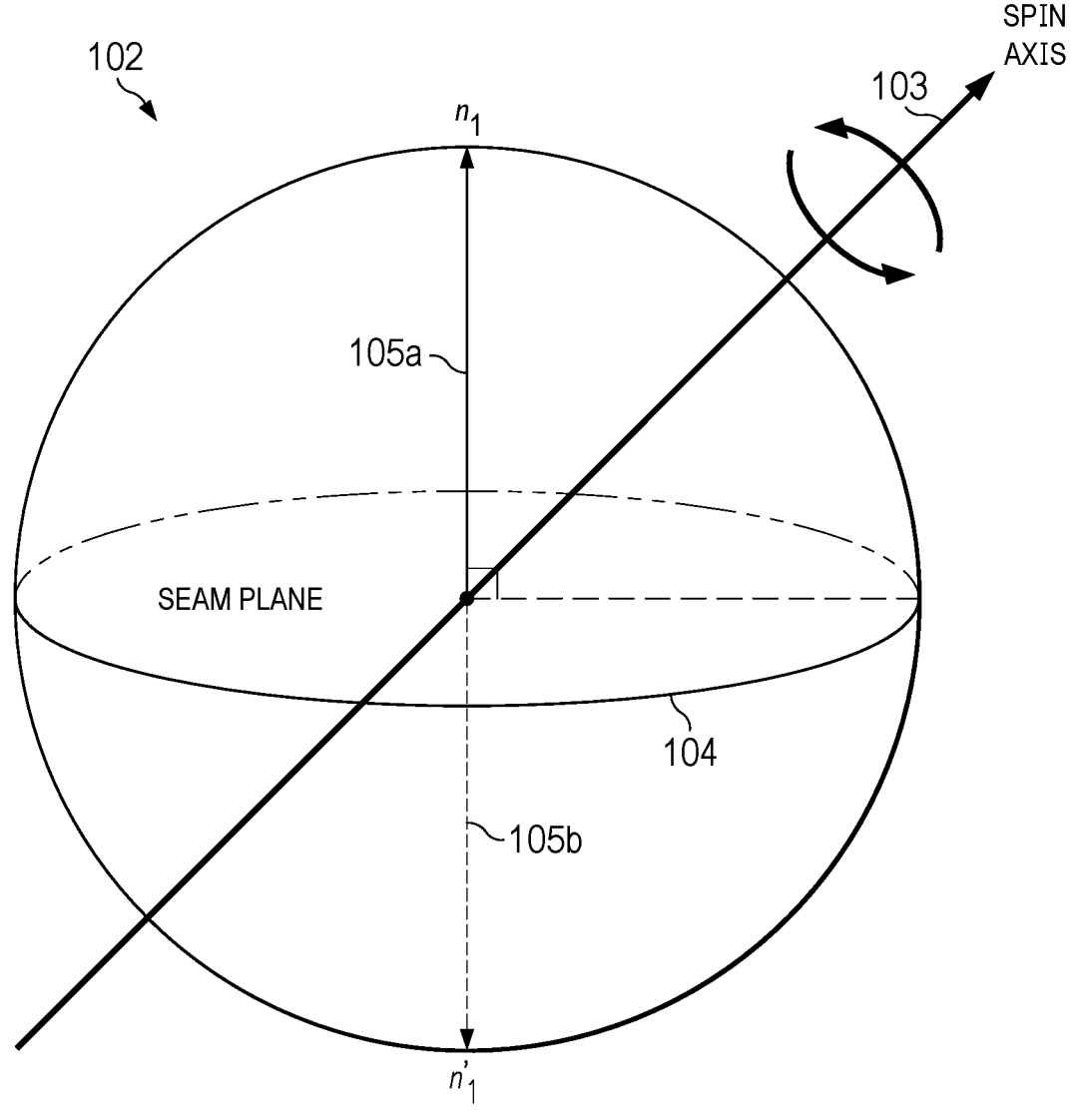
FIG. 1B illustrates a seam norm for the cricket ball of FIG. 1A.

FIG. 1A is a perspective view of cricket ball 100. Cricket ball 100 has a stable and constant seam line 101. Two feature points used for training neural networks are the seam norm vectors 105$a(n)$ and 105$b(n')$. These vectors are normal to seam plane 104 as shown in FIG. 1B (hereinafter also referred to as "seam norms"). As described below, the seam norms can be used to measure the spin rate and spin axis 103 of cricket ball 100 in flight or in motion. Although the discussion that follows is with respect to a cricket ball, the processes described below are applicable to any ball that has a seam (e.g., a golf ball with a marker, a softball or a baseball).

Figure 2:
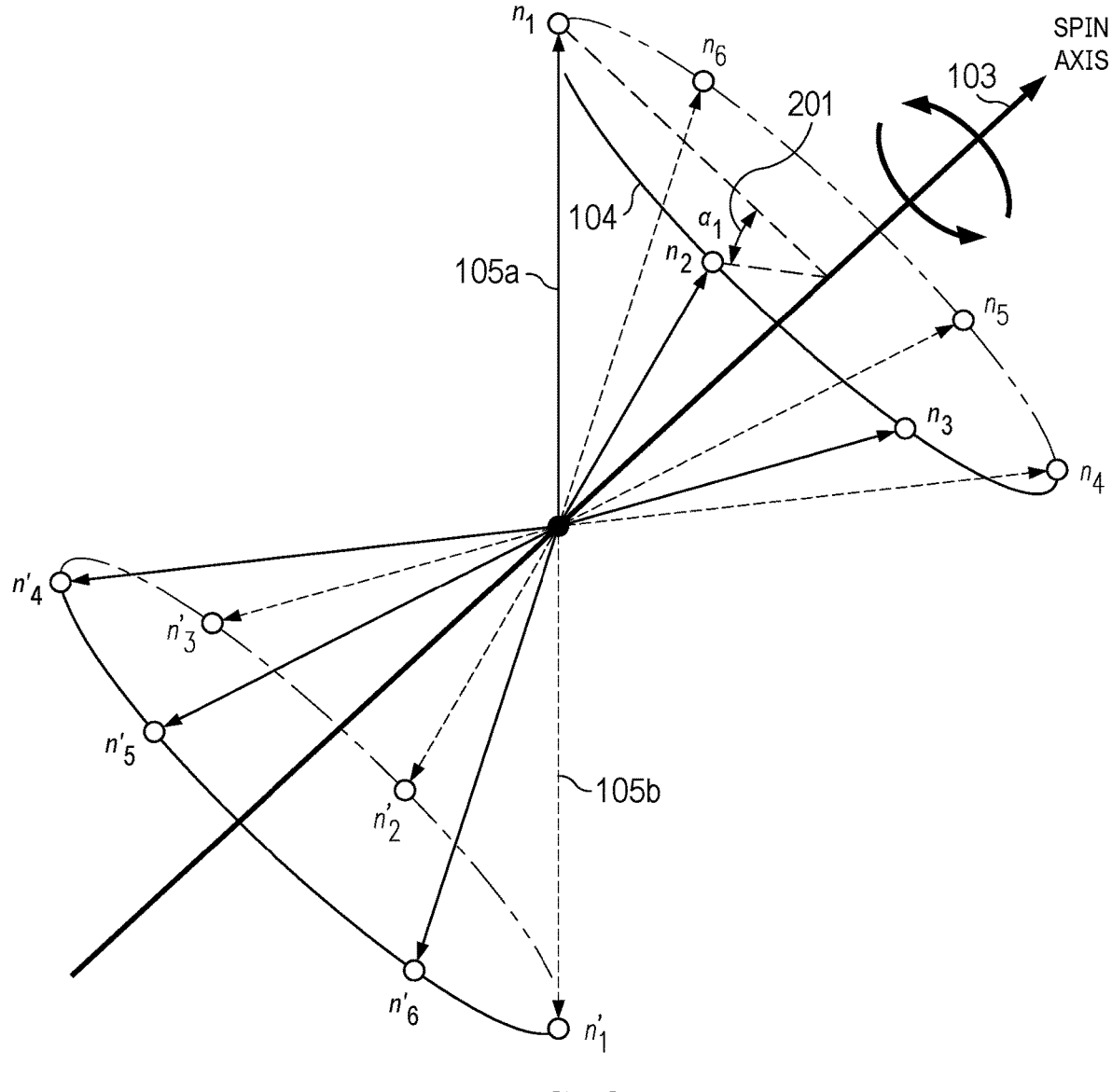
FIG. 2 is a three-dimensional (3D) diagram illustrating how the seam norm moves in 3D space over time for a ball in flight or in motion.

FIG. 2 is a 3D diagram illustrating how seam norms move in 3D space over time. As shown in FIG. 2, the seam norms of spinning ball 100 form two circles along and normal to spin axis 103 over time. If there are N sequential camera images captured of ball 100, the i-th ball is captured at time $t_i$ and its seam norms in 3D space are

4

$n_i = (x_i, y_i, z_i)$ and $n_i' = (-x_\square, -y_i, -z_i)$, where $x_i^2 + y_i^2 + z_i^2 = 1$ and $z_i > 0$.

Spin axis 103 (V=(a, b, c)) of ball 100 is obtained by fitting a plane to the 3D $n_i$ points according to Equation [1]:

$$a*x_i + b*y + c*z_i + d = 0, i = 1,2, \dots N, \qquad [1]$$

where d is the distance of the fitted plane from the origin.

The direction of spin axis 103 can be determined with the right hand rule from point $n_1$ to point $n_2$ in the circle as depicted in FIG. 2. Once spin axis 103 is determined, the spin rate can be obtained by determining the ratio of the angle 201 of $n_i$ to $n_{i+1}$ relative to spin axis 103 and the corresponding time difference of $t_{i+1}$ to $t_i$ as shown in Equation [2]:

$$spinRate = \sum_{i=1}^{N-1}\alpha_i / \sum_{i=1}^{N-1}\Delta T_i = \sum_{i=1}^{N-1}\alpha_i/(t_N - t_1), \qquad [2]$$

where $\alpha_i$ is the angle 201 of point $n_i$ to point $n_{i+1}$ relative to spin axis 103, and $\Delta T_i = t_{i+1} - t_i$ is the time difference of $t_{i+1}$ to $t_i$.

Example System

Figure 3:
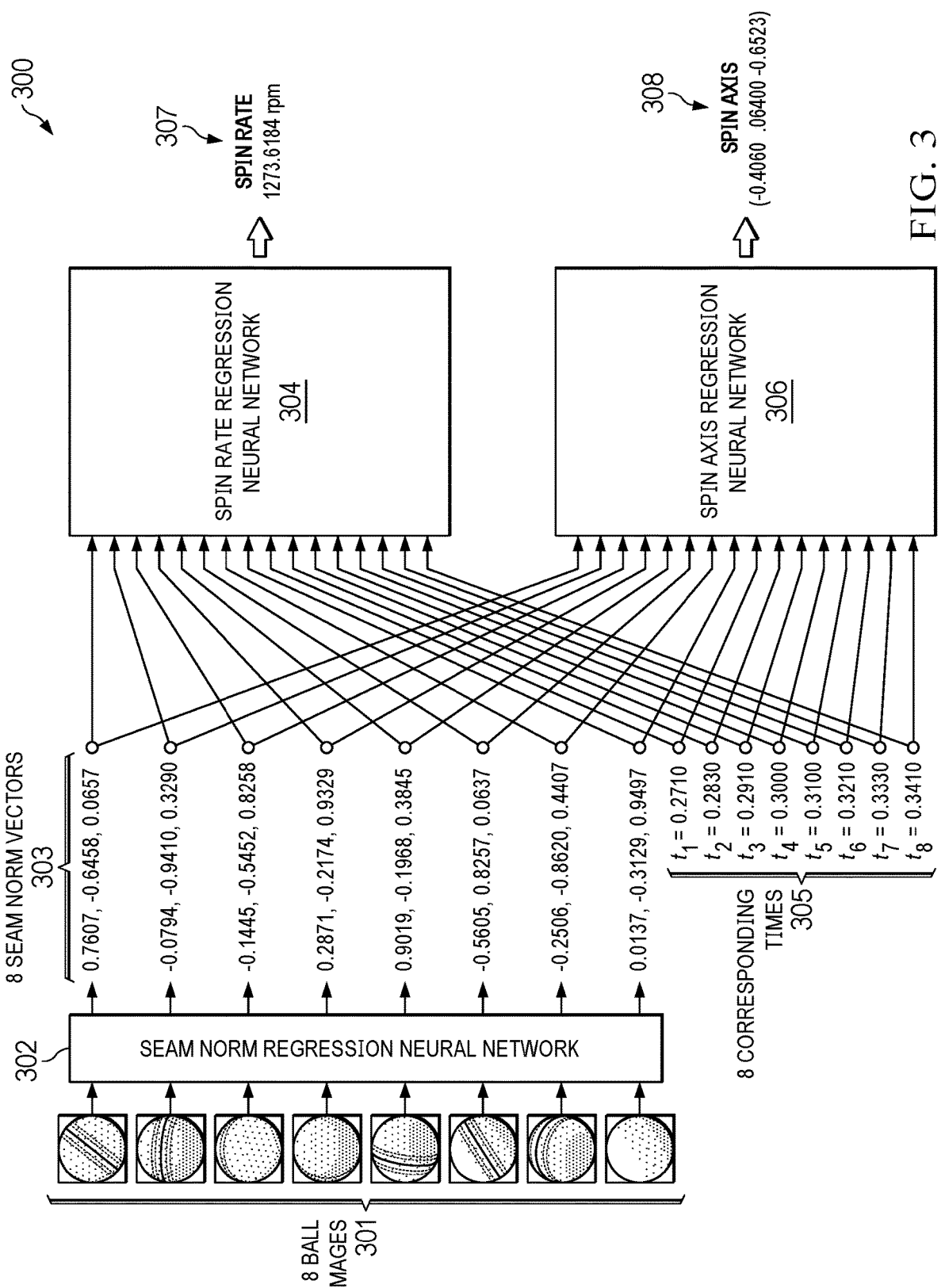
FIG. 3 is a block diagram of a deep learning network for predicting the spin rate and spin axis of a ball in flight or in motion, according to one or more embodiments.

FIG. 3 is a block diagram of deep learning network 300 for predicting spin rate and spin axis of a ball in flight or in motion, according to one or more embodiments. In this example embodiment, input 301 to network 300 (e.g., a deep learning network) includes 8 ball images and corresponding image capture times, and predicts the spin rate and spin axis of the ball, where each of the ball images contains spins about a different axis. In other embodiments, 3 or more ball images can be used. At least 3 points (seam norm) can determine one circle in 3D, and the spin axis is vertical to the circle. Once the spin axis is determined, any 2 points on the circle can be used to determine the spin rate as in Equation [2].

The example network 300 shown in FIG. 3 includes three deep learning neural networks (nodes): seam norm regression neural network 302, spin rate regression neural network 304 and spin axis regression neural network 306. In some embodiments, seam norm regression neural network 302 regresses 8 seam norm vectors 303 from input 301 with batch processing. Spin rate and axis regression neural networks 304, 306, regress spin rate 307 and spin axis 308, respectively, from the input of seam norm vectors 303 and corresponding image capture times 305, respectively.

Note that although deep learning networks are shown in FIG. 3, other machine learning models are also possible.

In some embodiments, a specific method for baseball can be used without the use of stickers or other seam proxies. A cricket ball is 2 symmetrical and a baseball is 4 symmetrical. Thus, two seam planes can be used to make sure every baseball image captured by the camera is unique. In some embodiments, the same seam norm regression, spin axis and rate regression neural networks for the cricket ball can be used for the baseball, with the difference as follows. For the seam norm regression neural network, the input is a baseball image, and the output is two seam norm vectors. One seam norm vector is (x, y, z) and its vertical is (x', y', z'). For the spin axis and rate regression neural network, the input is a combination of all the seam norm vectors and the time difference. The output is the spin axis and spin rate, respectively.

Figure 4:
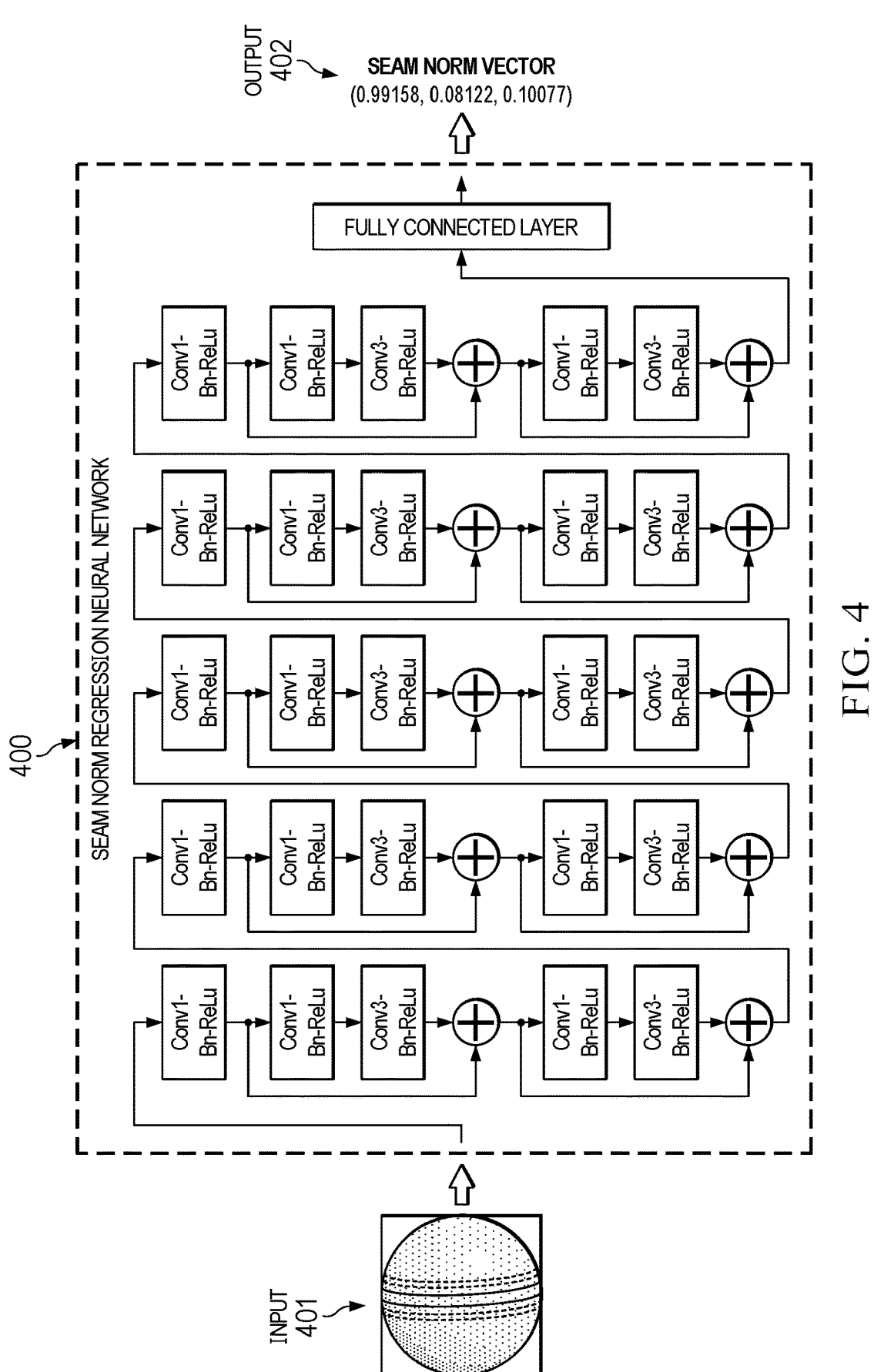
FIG. 4 illustrates a seam norm regression neural network, according to one or more embodiments.

FIG. 4. illustrates a seam norm regression neural network 400, according to one or more embodiments. Instead of seam line segmentation, seam norm regression neural network 400 is directly trained. In this example embodiment, input 401 is a 64×64 sized ball image and output 402 is its seam norm vector. In this example configuration, seam norm regression neural network 400 includes 5 blocks, each block with one transition unit to downsample the feature size, followed by 2 residual units. Each block includes three sub-blocks oplus two sub-blocks, where the oplus may denote an exclusive or, dilation or direct sum. Each sub-block includes a convolution filter, a batch normalization function and a rectified linear unit. The convolution filter may be of size 1×1 or 3×3. Output 402 includes three nodes, representing the three vector component magnitudes (x, y, z) in 3D space. In this example, seam norm regression neural network 400 is trained for 300 epochs with a batch size of 128 using stochastic gradient descent with Nesterov momentum of 0.9 without dampening, and a weight decay of $10^{-4}$. The learning rate is cosine-shaped reducing from 0.1 to 0. The learning rate is a scalar value to tune a neural network to achieve better performance. Learning rate determines the step size at each training iteration while moving toward an optimum of a loss function. The direction towards an optimum of a loss function can be found by calculating a gradient of the loss function. The learning rate parameter specifies how large the step size is considered in the direction towards the optimum.

In some embodiments, the blocks of neural network 400 may be arranged in series, where the blocks are daisy chained, and where the last block is connected to a fully connected layer. In some embodiments, the blocks of neural network 400 may be arranged in parallel manner, where the blocks are daisy chained, and where the last block is connected to a fully connected layer. In some embodiments, real images of the ball are used with ground truth data to train neural network 400. In other embodiments, synthetic data is used together with, or in lieu of, the real image data for training neural network 400. For example, synthetic ball images can be generated with non-uniform lighting, complex backgrounds occlusions, artifacts and different types of balls, resulting in additional synthetic ball images with their seam norms uniformly allocated on the unit sphere.

In some embodiments, during training, the real and/or synthetic ball images can be augmented by modifying the color, contrast, brightness, sharpness, shift, and noise level of the ball images. The augmentation levels of color, contrast, brightness, and sharpness can be random ranging from about 0.8 to about 1.2, for example. In this example embodiment, the maximum shift is 4 pixels, which is the maximum error caused by ball finding. For noise, Gaussian blur or other suitable image processing technique can be applied, with a sigma value that varies from about 0.1 to about 9.0, for example.

In some embodiments, an augmentation level of 1.0 corresponds to the original image, i.e., not applying any data augmentation. Data augmentation is used to minimize the gap between training and testing data. For example, if the training images have a brightness level of 10, and the testing images have a brightness level of 8, there is 2=10−8 difference in brightness levels. This data shift causes lower testing accuracy of the pretrained model. By applying data augmentation with, for e.g., a random ratio from 0.8 to 1.2, the pretrained model can have good accuracy with brightness from 8(0.8*10) to 12(1.2*10). In some embodiments, the range can be fine-tuned to have a better accuracy on the set of test images. Thus, the brightness range can be wider but it cannot be lower than 0, which corresponds to a completely black image. Note that the brightness range cannot be too high either, since the maximal intensity is 255. Thus, in this example, the top ratio for brightness is given by 255/(current training brightness).

Figure 5:
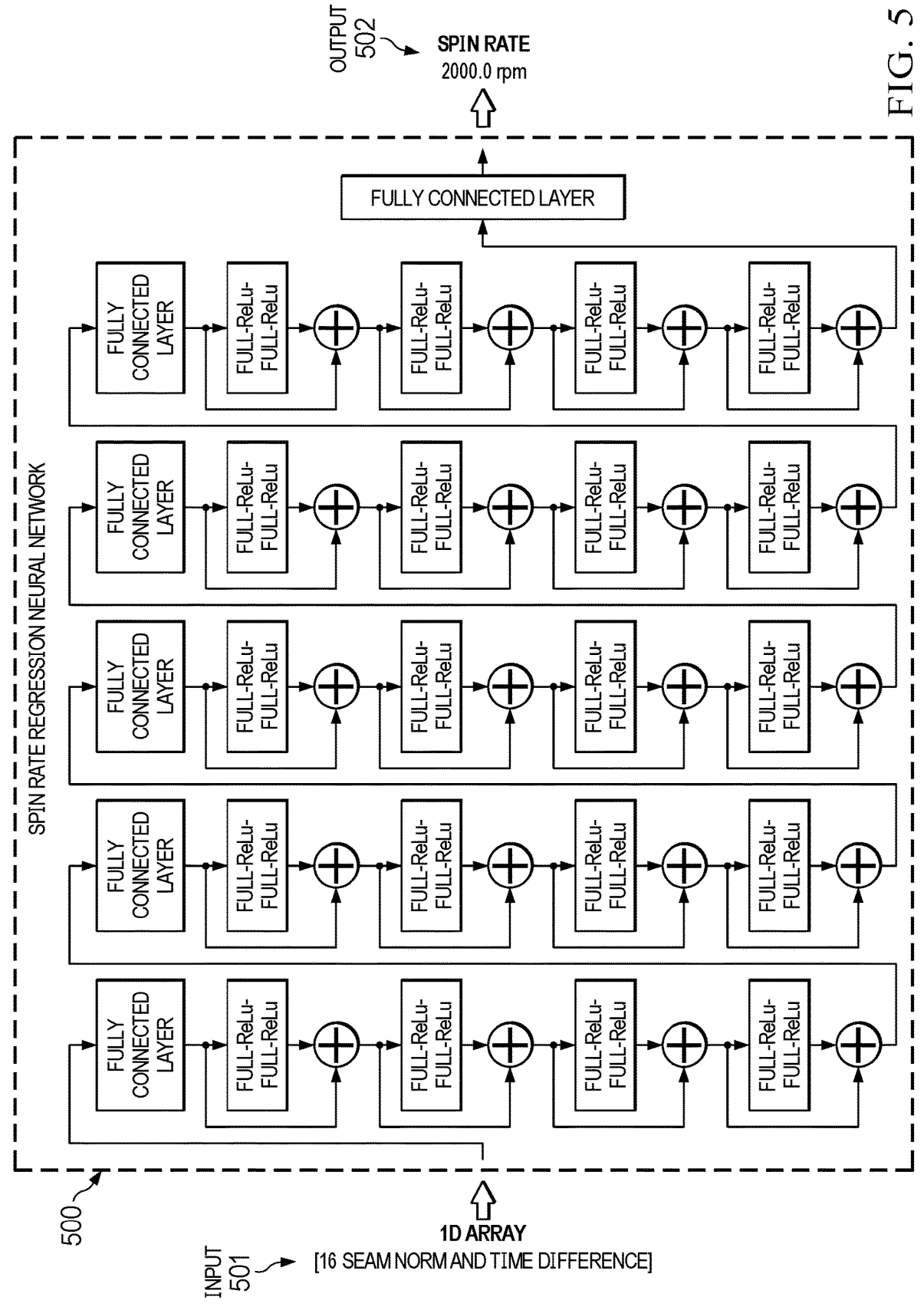
FIG. 5 illustrates a spin rate regression neural network, according to one or more embodiments.
Figure 6:
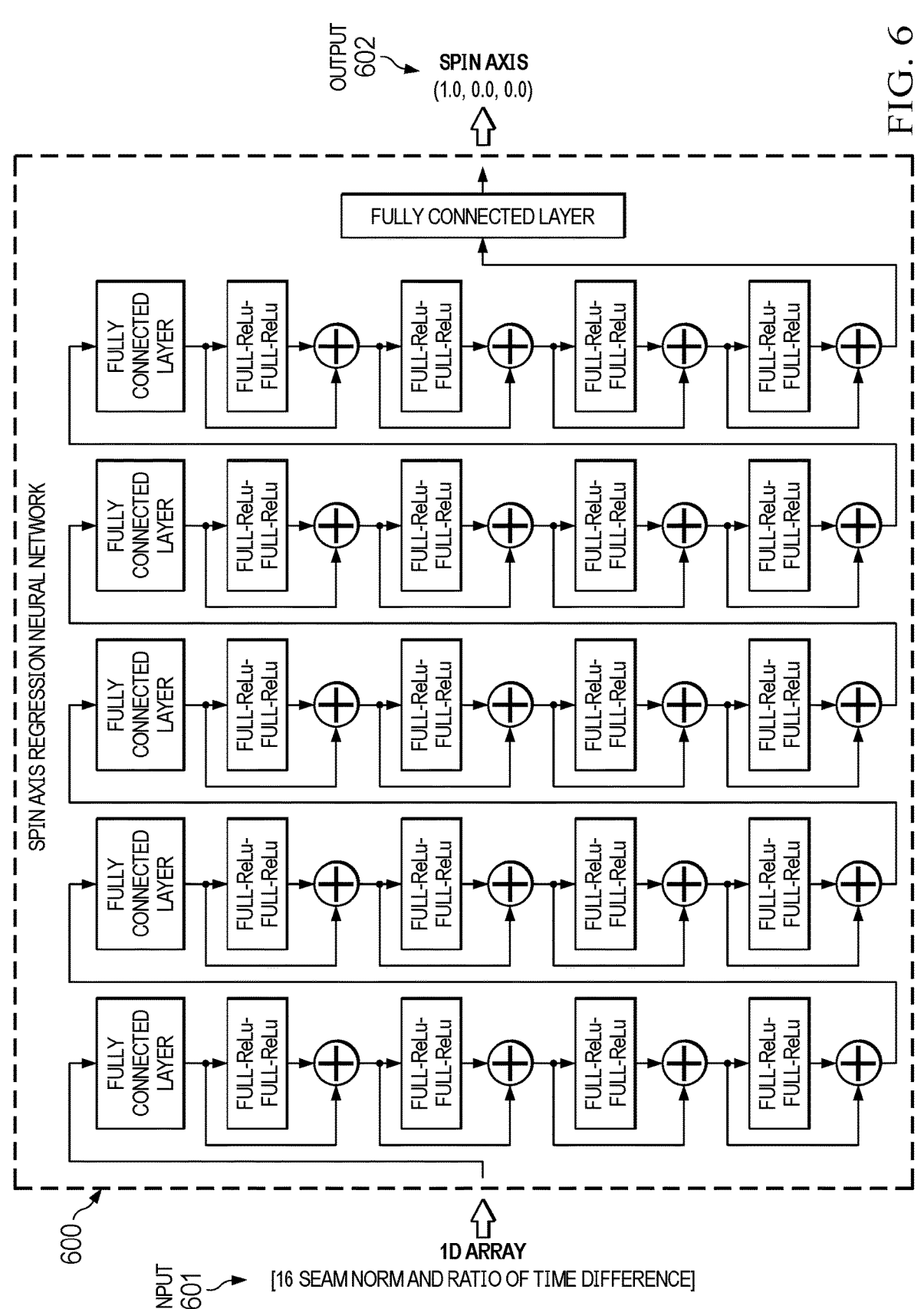
FIG. 6 illustrates a spin axis regression neural network, according to one or more embodiments.

FIG. 5 illustrates a spin rate regression neural network 500, according to one or more embodiments, and FIG. 6 illustrates a spin axis regression neural network 600, according to one or more embodiments. In this example, both spin rate and axis regression neural networks 500, 600 share the same architecture. It is to be understood that a different architecture of regression neural networks may also be used. Inputs 501, 601 are 1D arrays that include 16 seam norms and corresponding time differences. Output 502 for neural network 500 includes one node to regress spin rate, and output 602 for neural network 600 includes three nodes to regress spin axis in 3D space, respectively.

Both neural networks 500 and 600 each have 5 blocks, where each block includes one fully connected layer to increase the number of inputs and 4 residual units. Each residual unit includes a first fully connected layer coupled to a first activation function (e.g., a rectified linear unit (ReLU) activation function), followed by a second fully connected layer, followed by a second activation function (e.g., a ReLU activation function). Similar to seam norm neural network 400, in this example embodiment, neural networks 500, 600 are trained for 1000 epochs with batch processing using a batch size of 2560, stochastic gradient descent with Nesterov momentum of 0.9 without dampening, and a weight decay of $10^{-4}$. The learning rate is cosine-shaped reducing from 0.1 to 0.

FIGS. 7A and 7B illustrate synthetic seam norm vector generation, according to one or more embodiments. Referring to FIG. 7A, inputs 501, 601 for spin rate regression neural network 500 and spin axis regression neural network 600, respectively, are shown. In this example embodiment, inputs 501, 601 are 1D arrays that each include 16 seam norms, including $n_i=(x_i, y_i, z_i)$ and $n_i'=(-x_i, -y_i, -z_i)$, where $i=1, 2, \ldots 8$. Additionally, the 1D array for input 501 includes time differences $\Delta T_j$ and the 1D array for input 601 includes time difference ratios $\Delta T_j/\Delta T_{j+1}$, where $j=1, 2, 3, 4 \ldots 7$.

The spin rate of a cricket ball is typically in a range of about 400 to about 3000 revolutions per minute (abbreviated as rpm), and the spin axis can be any unit vector in 3D space. The spin axis can be uniformly allocated along the whole unit sphere, where each spin axis has a random spin rate in a range of about 300 to about 3600 rpm. As shown in FIG. 7B, in some embodiments, one spin axis is picked from the unit sphere and another point $n_1$ is chosen as the initial seam norm. In some embodiments, a random number from 300 to 3600 is chosen as the spin rate, and $n_1$ is rotated with different time differences to generate 7 seam norms. In some embodiments where ball images are captured by two cameras (a spin camera and a speed camera), there are two different timings. For the speed camera, the time difference is constant at, e.g., 1.0/220 s. For a spin camera, the time difference is, e.g., 8, 9, 10, 11, and 12 ms.

To make both the spin rate and spin axis regressions more robust, in some embodiments, 3 out of 8 seam norms are allowed as outliers with a 2 degree difference from groundtruth for each seam norm. During training, 3 seam norms are randomly selected and initialized with random values, and each seam norm is rotated with a random degree from 0 to 2 degrees in a random direction, for example.

Example Process

Figure 8:
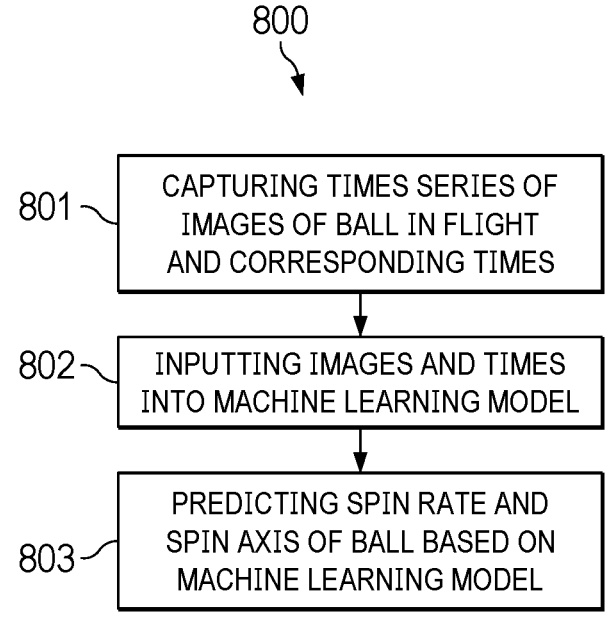
FIG. 8 is a flow diagram of a process of determining the spin rate and the spin axis of a ball in flight, according to one or more embodiments.

FIG. 8 is a flow diagram of a process of determining the spin rate and the spin axis of a ball in flight, according to one or more embodiments. Process 800 can be implemented in, for example, a ball launch monitoring system 900, as described in reference to FIGS. 9 and 10.

Process 800 includes: capturing, with an image sensor, a time series of images of a ball in-flight and corresponding image capture times (801), inputting the image frames and the image capture times into a machine learning model (802), and predicting a spin axis and a spin rate of the ball based on the machine learning model (803). Each of these steps were previously described above in reference to FIGS. 3-7.

Example Ball Launch Monitoring System

Figure 9:
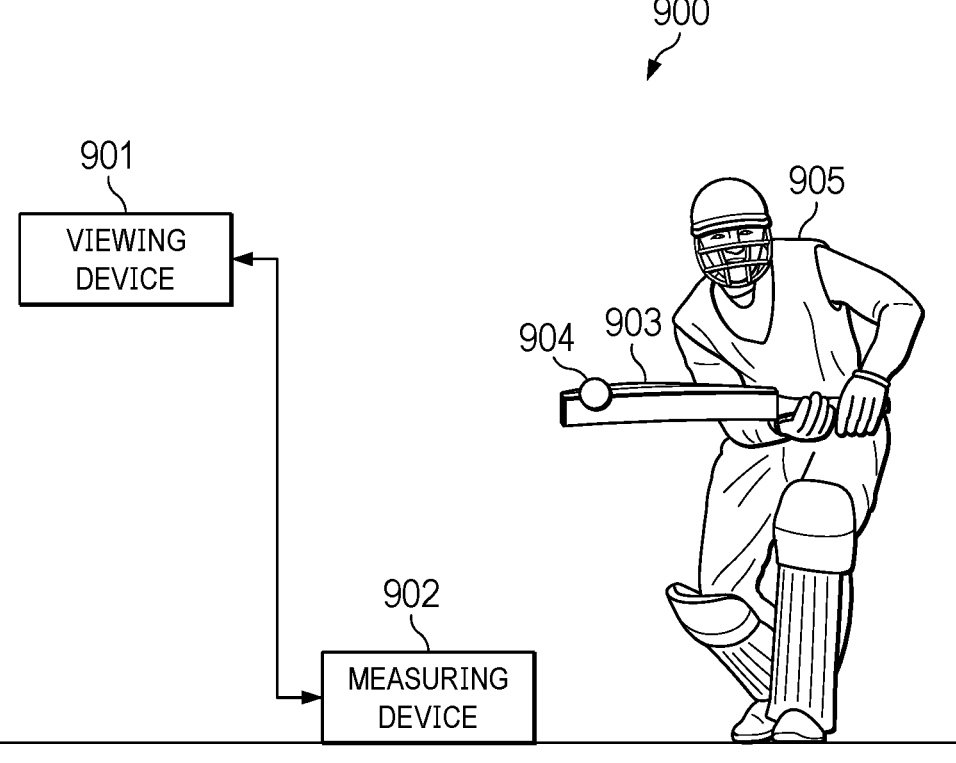
FIG. 9 is a block diagram of a ball launch monitoring system, which includes a measuring device that utilizes the processes described in reference to FIGS. 3-8, according to one or more embodiments.

FIG. 9 is a block diagram of a ball launch monitoring system 900, according to one or more embodiments. Measurement or measuring device 902 is positioned on the floor or ground behind user 905 (e.g., behind cricket ball 904), who uses bat 903 to strike cricket ball 904. Processing of data can be further done through a cloud service. Viewing device 901 (e.g., computer or mobile device) is provided for user 905 or their coach to visualize the measurement results on a display screen (e.g., display screen of a computer or mobile device). Alternatively, or additionally, measurement device 902 may be positioned to a side of user 905.

Figure 10:
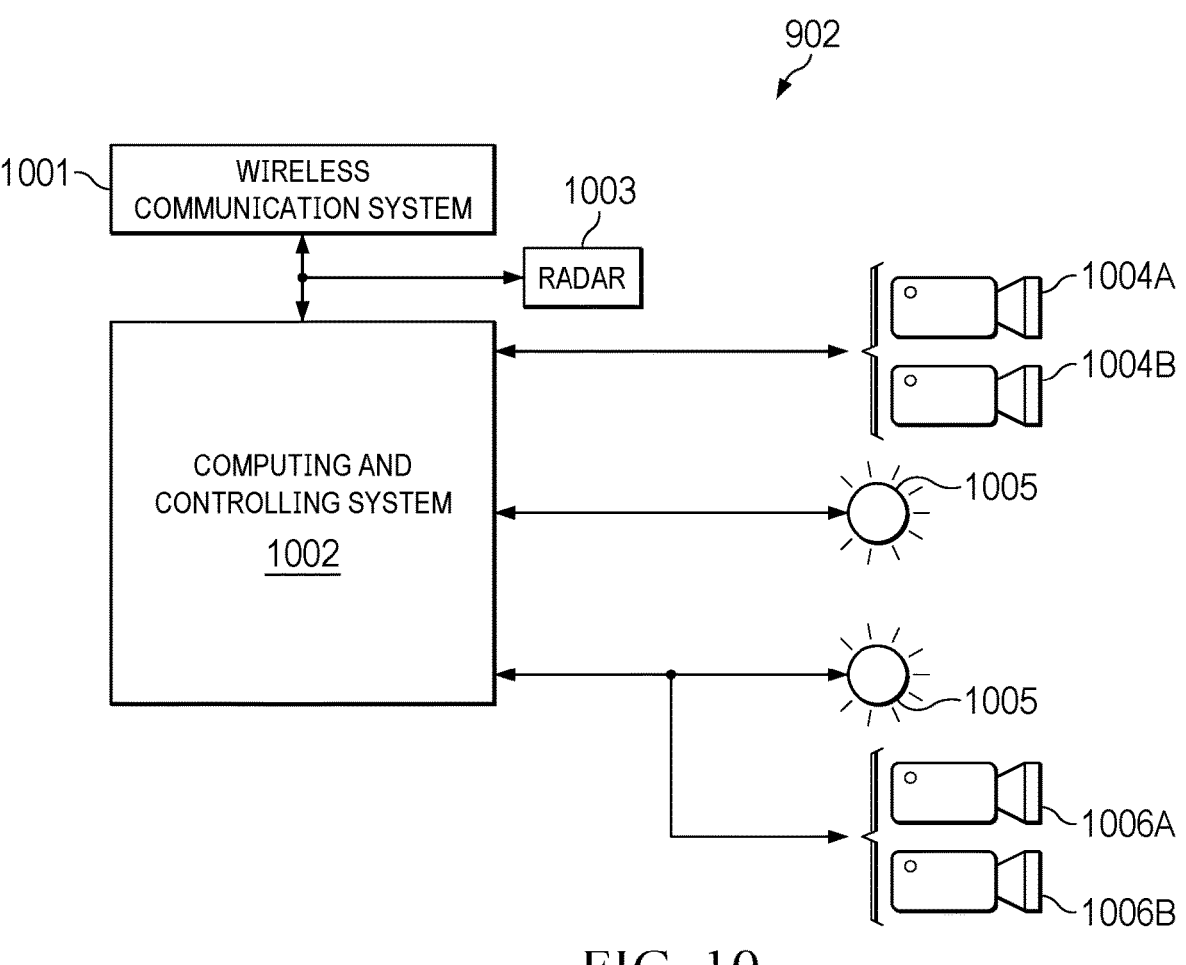
FIG. 10 is a block diagram of the measuring device of FIG. 9, according to one or more embodiments.

FIG. 10 is a block diagram of measuring device 902 of FIG. 9, according to one or more embodiments. In some embodiments, measurement device 902 may include two sets cameras. The first set of cameras includes two high-speed, low resolution cameras 1004A, 1004B that form a first stereo system for measuring the movement of the bat and cricket ball during a swing of bat 903 by user 905. The second set of cameras includes two high-resolution cameras 1006A, 1006B that form a second stereo system for measurement of the ball trajectory. In some embodiments, the second set of cameras may have a lower speed than the first set of cameras. In some embodiments, lighting system 1005 ensures properly lit images for 3D scanning of bat 903, radar unit 1003 provides timing and sequencing of image captured by cameras 1004A, 1004B, 1006A, 1006B, computing and controlling system 1002 performs real-time processing of the captured images and radar signals, and wireless communication system 1001 sends data to viewing device 901 shown in FIG. 9.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:

capturing, with an image sensor, a time series of images of a ball in flight and corresponding image capture times;

inputting, with at least one processor, the image frames and the image capture times into a machine learning model;

predicting, with the at least one processor, a spin axis and a spin rate of the ball based on the machine learning model;

wherein the machine learning model includes:

a first neural network trained to predict seam norms of the ball in 3D space based on a training set of ball images;

a second neural network trained to predict the spin rate of the ball based on the predicted seam norms and time differences obtained from the training set of ball images; and a third neural network trained to predict the spin axis of the ball based on the predicted seam norms and ratios of the time differences.

2. The method of claim 1, wherein the training set of ball images include synthetic ball images of different types of balls, and wherein the ball images have non-uniform lighting, complex backgrounds, occlusions, or artifacts.

3. The method of claim 1, wherein the training set of ball images include augmented ball images of different types of balls, and wherein the ball images have at least one of random color, random contrast, random brightness, random sharpness, random shift or random noise level.

4. The method of claim 1, wherein randomly generated synthetic seam norms are used to train the first neural network.

5. The method of claim 1, wherein the first, second and third neural networks are trained using batch processing, stochastic gradient descent, Nesterov momentum without dampening, a weight decay or a cosine-shaped learning rate.

6. The method of claim 5, wherein the first neural network comprises M blocks, where each block includes a transition unit to downsample a feature size, followed by N residual units, where N and M are integer values greater than zero.

7. The method of claim 5, wherein the second and third neural networks each include M blocks, each block having a fully connected layer to increase a number of inputs, followed by N residual units, where each residual unit includes a first fully connected layer, followed by a first activation function, followed by a second fully connected layer, followed by a second activation function, where N and M are integer values greater than zero.

8. The method of claim 1, wherein the first, second and third neural networks are regression neural networks.

9. The method of claim 1, wherein the ball is a cricket ball.

10. A system comprising:

at least one camera;

at least one processor;

memory storing instructions that when executed by the at least one processor, cause the at least one processor to perform operations comprising:

capturing, with the at least one camera, a time series of images of a ball in-flight and corresponding image capture times;

inputting the image frames and image capture times into a machine learning model;

predicting, with the machine learning model, a spin axis and a spin rate of the ball;

wherein the machine learning model includes:

a first neural network trained to predict seam norms of the ball in 3D space based on a training set of ball images;

a second neural network trained to predict the spin rate of the ball based on the predicted seam norms and time differences obtained from the training set of ball images; and a third neural network trained to predict the spin axis of the ball based on the predicted seam norms and ratios of the time differences.

11. The system of claim 10, wherein the training set of ball images include synthetic ball images of different types of balls, and wherein the ball images have non-uniform lighting, complex backgrounds, occlusions, or artifacts.

12. The system of claim 10, wherein the training set of ball images include augmented ball images of different types of balls, and wherein the ball images have at least one of random color, random contrast, random brightness, random sharpness, random shift or random noise level.

13. The system of claim 10, wherein randomly generated synthetic seam norms are used to train the first neural network.

14. The system of claim 10, wherein the first, second and third neural networks are trained using batch processing, stochastic gradient descent, Nesterov momentum without dampening, a weight decay or a cosine-shaped learning rate.

15. The system of claim 10, wherein the first, second and third neural networks are regression neural networks.

16. The system of claim 15, wherein the first neural network comprises M blocks, where each block includes a transition unit to down sample a feature size, followed by N residual units, where M and N are integer values greater than zero.

17. The system of claim 15, wherein the second and third neural networks each include M blocks, each block having one fully connected layer to increase a number of inputs, followed by N residual units, where each residual unit includes a first fully connected layer, followed by a first activation function, followed by a second fully connected layer, followed by a second activation function, where M and N are integer values greater than zero.

18. The system of claim 10, wherein the ball is a cricket ball.

19. An apparatus comprising:

at least one camera;

at least one processor;

memory storing instructions that when executed by the at least one processor, cause the at least one processor to perform operations comprising:

capturing, with the at least one camera, a time series of images of a ball in-flight and corresponding image capture times;

inputting the image frames and image capture times into a machine learning model; and predicting, with the machine learning model, a spin axis and a spin rate of the ball;

wherein the machine learning model includes:

a first neural network trained to predict seam norms of the ball in 3D space based on a training set of ball images;

a second neural network trained to predict the spin rate of the ball based on the predicted seam norms and time differences obtained from the training set of ball images; and a third neural network trained to predict the spin axis of the ball based on the predicted seam norms and ratios of the time differences.

20. The apparatus of claim 19, wherein the training set of ball images include synthetic ball images of different types of balls, and wherein the ball images have non-uniform lighting, complex backgrounds, occlusions, or artifacts.

\* \* \* \* \*